United States Patent [19]

Katayama et al.

[11] Patent Number: 5,771,404

[45] Date of Patent: Jun. 23, 1998

[54] SHAKE PREVENTING APPARATUS IN CAMERA

[75] Inventors: Akira Katayama, Koganei; Tadao Kai, Kawasaki, both of Japan

[73] Assignee: Nikon Corporation, Tokyo, Japan

[21] Appl. No.: 842,533

[22] Filed: Apr. 15, 1997

Related U.S. Application Data

[62] Division of Ser. No. 741,528, Nov. 1, 1996, which is a continuation of Ser. No. 205,131, Mar. 1, 1994, abandoned, which is a continuation of Ser. No. 2,883, Jan. 11, 1993, abandoned.

[30] Foreign Application Priority Data

Jan. 14, 1992 [JP] Japan .................................. 4-24769

[51] Int. Cl.$^6$ ................................................ G03B 17/00
[52] U.S. Cl. ............................................ 396/52; 396/55
[58] Field of Search ........................................ 396/52, 55

[56] References Cited

U.S. PATENT DOCUMENTS 5,231,445  7/1993  Onuki et al. ............................ 396/55
5,335,042  8/1994  Imafuji et al. ........................... 396/55
5,414,486  5/1995  Goto et al. .............................. 396/52

Primary Examiner—Russell E. Adams
Attorney, Agent, or Firm—Shapiro and Shapiro

[57] ABSTRACT

A shake preventing apparatus in a camera, comprises a shake detecting device for detecting an amount of shake upon small motion of the camera, a shake correcting device for correction-driving a photo taking optical system in a direction to keep an image on a plane of a film unshaken, based on the amount of shake detected by the shake detecting device, a shake correction limit determining device for determining a shake correction limit amount which is a limit for the shake correcting device to correct the shake, and a shutter controlling device for controlling a shutter to close when the amount of shake detected by the shake detecting device exceeds the shake correction limit amount determined.

2 Claims, 8 Drawing Sheets

SHAKE PREVENTING APPARATUS IN CAMERA

This is a division of application Ser. No. 08/741,528 filed Nov. 1, 1996, which is a continuation of application Ser. No. 08/205,131 filed Mar. 1, 1994 (abandoned), which is a continuaton of application Ser. No. 08/002,883 filed Jan. 11, 1993 (abandoned).

BACKGROUND OF THE INVENTION

1. Field of the Invention

The present invention relates to a shake preventing apparatus in a image to prevent camera shake.

2. Related Background Art

A conventional shake preventing apparatus of this type is known to carry out such a control that an amount of camera shake is detected in a certain time immediately before release, whereby, when the shake amount is greater than a permissible shake amount preliminarily determined, a program is shifted to a shutter time in which the shake amount drops within the permissible shake amount, or, in addition to the shift to the shutter time for the shake amount to drop within the permissible shake amount, a stop is shifted to have a stop value as close to an initial setting as possible considering a latitude of a film, or a focal length is changed (as disclosed in Japanese Laid-open Patent Application No. 63-116132).

The above conventional shake preventing apparatus executes the shake prevention operation based on an estimation of shake. Occurrence of shake depends upon people, and shakes can vary even with a single photographer. Therefore, the shake estimation has a very low probability.

Room for shift of shutter time is little in a lens with a dark f-number at open aperture such as a super telephoto lens and a high magnification zoom lens, which is readily shaken and which is likely to have an open stop. Thus the shake preventing effect is small in such a lens.

Further, the camera is not arranged to correct the shake itself, in which changes of shutter time, stop value, focal length, and the like are frequently carried out. It is thus difficult to obtain a photograph matching a photographic purpose by using such a camera, which is very difficult in handling.

There has been a technique employed as a countermeasure for preventing the image shake, in which shake detecting means is provided in a camera to properly grasp a situation of shake, whereby a warning display is given to a photographer, whereby a part of a photo-taking lens optical system is arranged as a shake correction optical system to be moved in a direction normal to the optical axis so as to correct a deviation of imaging position caused by the shake, or whereby, under a situation in which the shake correction is impossible, a control is effected for disabling the capability to take a photograph.

Such a countermeasure is, however, still insufficient, because there is no consideration on various photographic conditions such as exposure conditions for example of a shutter speed and a stop amount, and as a distance to a subject. Then for example in a camera with a built-in electronic flash unit or in a camera on which an electronic flash unit is mounted, taking into account the above exposure conditions, an electronic flash photography is selectively carried out when the shutter speed is over a camera shake limit in a normal photography, while the exposure conditions are controlled in desired states.

There are proposals to meet such needs, for example a camera having shake detecting means as disclosed in Japanese Laid-open Patent Application No. 59-222823, in which when the shake exceeds a predetermined value the electronic flash photography is selected, and a camera having shake preventing means as disclosed in Japanese Laid-open Patent Application No. 2-116835, in which if the shake preventing means cannot prevent the shake the electronic flash photography is selected.

Although the above-described conventional image shake preventing apparatuses can prevent the image shake to some extent, they are not fully satisfactory yet and have problems in bringing them into practical use.

The above conventional apparatuses are intended to prevent the shake by making use of the electronic flash photography. In the former, the vibration may be prevented of a main subject within reach of electronic flash light, but the background beyond reach of electronic flash light is shaken. In the latter, the shake prevention is little effective if a main subject is located at a far distance beyond reach of electronic flash light.

SUMMARY OF THE INVENTION

It is an object of the present invention, solving the above problems, to provide a shake preventing apparatus which is great in shake prevention effect with a low frequency of shutter time shift, which permits a photography pursuant to a photographic purpose, and which can broaden a range of hand carrying photography without shake, whereby enhancing the operability thereof.

It is another object of the present invention, also solving the above problems, to provide a shake preventing apparatus in a camera which prevents the image shake caused by camera shake by making use of electronic flash photography to achieve more effective shake prevention as compared to the conventional apparatuses.

To achieve these object, a shake preventing apparatus according to the present invention is arranged to comprise shake detecting means for detecting an amount of shake upon small motion of a camera, shake correcting means for correction-driving a photo taking optical system in a direction to keep an image on a plane of a film unshaken, based on the amount of shake detected by the shake detecting means, shake correction limit detecting means for detecting a shake correction limit for the shake correcting means to correct the shake, and shutter controlling means for controlling a shutter to close when the shake correction limit detecting means detects the shake correction limit.

In the above arrangement, the apparatus may be characterized in that the shutter controlling means controls the shutter to close when the shake correction limit detecting means detects the shake correction limit and when an exposure amount is within a predetermined range of correct exposure amount.

A shake preventing apparatus according to the present invention may be arranged to comprise shake detecting means for detecting an amount of shake upon small motion of a camera, shake correcting means for correction-driving a photo taking optical system in a direction to keep an image on a plane of a film unshaken, based on the amount of shake detected by the shake detecting means, shake correction limit detecting means for detecting a shake correction limit for the shake correcting means to correct the shake, shake prevention priority mode setting means for setting a mode to give a priority to shake prevention, and shutter controlling means for controlling a shutter to close when the shake correction limit detecting means detects the shake correction limit in case that the shake prevention priority mode is set, but for controlling the shutter to provide correct exposure even when the shake correction limit is detected in case that the shake prevention priority mode is not set.

The shutter controlling means executes an operation to close the shutter immediately when the shake correction limit detecting means detects the shake correction limit and when the exposure amount is within a predetermined range of correct exposure amount in case that the shake prevention priority mode is set, but carries out a control operation to achieve a correct exposure even when the shake correction limit is detected in case that the shake prevention priority mode is not set.

The apparatus may be characterized in each above case in that the predetermined range depends on exposure latitude of the film.

According to the present invention, the shutter time may be shifted in a predetermined range determined, for example, by the exposure latitude of film, when the shake correction limit is detected during exposure. In case that the shake prevention priority mode is set and when the shake correction limit is detected during exposure, the shutter time may be shifted within a range. In contrast, in case that the shake prevention priority mode is not set (or in case of exposure priority mode), the shutter time provides a correct exposure irrespective of the detection of the shake correction limit.

Further, a shake preventing apparatus in a camera according to the present invention is arranged to comprise shake detecting means, distance measuring means, and photometry means, the camera being capable of selecting an electronic flash photography if a shake amount detected by the shake detecting means is greater than a predetermined value, in which when the electronic flash photography is selected, a set value for a shutter time set according to a photometry result of the photometry means is made changeable.

Also, the shake preventing apparatus in the camera according to the present invention is arranged such that when the electronic flash photography is selected and when the shutter time set according to the photometry result of the photometry means is greater than a predetermined value, respective set values for the shutter time and for a stop value set according to the photometry result of the photometry means are made changeable.

Further, the shake preventing apparatus in the camera according to the present invention is arranged such that when the shake amount detected by the shake detecting means is greater than a predetermined value and either when the electronic flash unit is in an uncharged state or when a distance measurement result of the distance measuring means shows a farther distance than a predetermined value, the electronic flash photography is not selected and only the shutter time set according to the photometry result of the photometry means is made changeable.

According to the present invention, in case that the shake amount detected by the detecting means is large and the electronic flash photography is selected, such a control may be carried out that the shutter is immediately closed after the electronic flash light emission.

Also, according to the present invention, in case that the shake amount is large, that the electronic flash photography is selected, and that the shutter time set is long, the stop is opened after the electronic flash light emission and the shutter time can be shortened thereby.

Further, according to the present invention, in case that the shake amount is large and either that the electronic flash unit is uncharged or that the subject is too far, no electronic flash light is emitted and only the shutter time is shortened.

DESCRIPTION OF THE PREFERRED EMBODIMENTS

Figure 1:
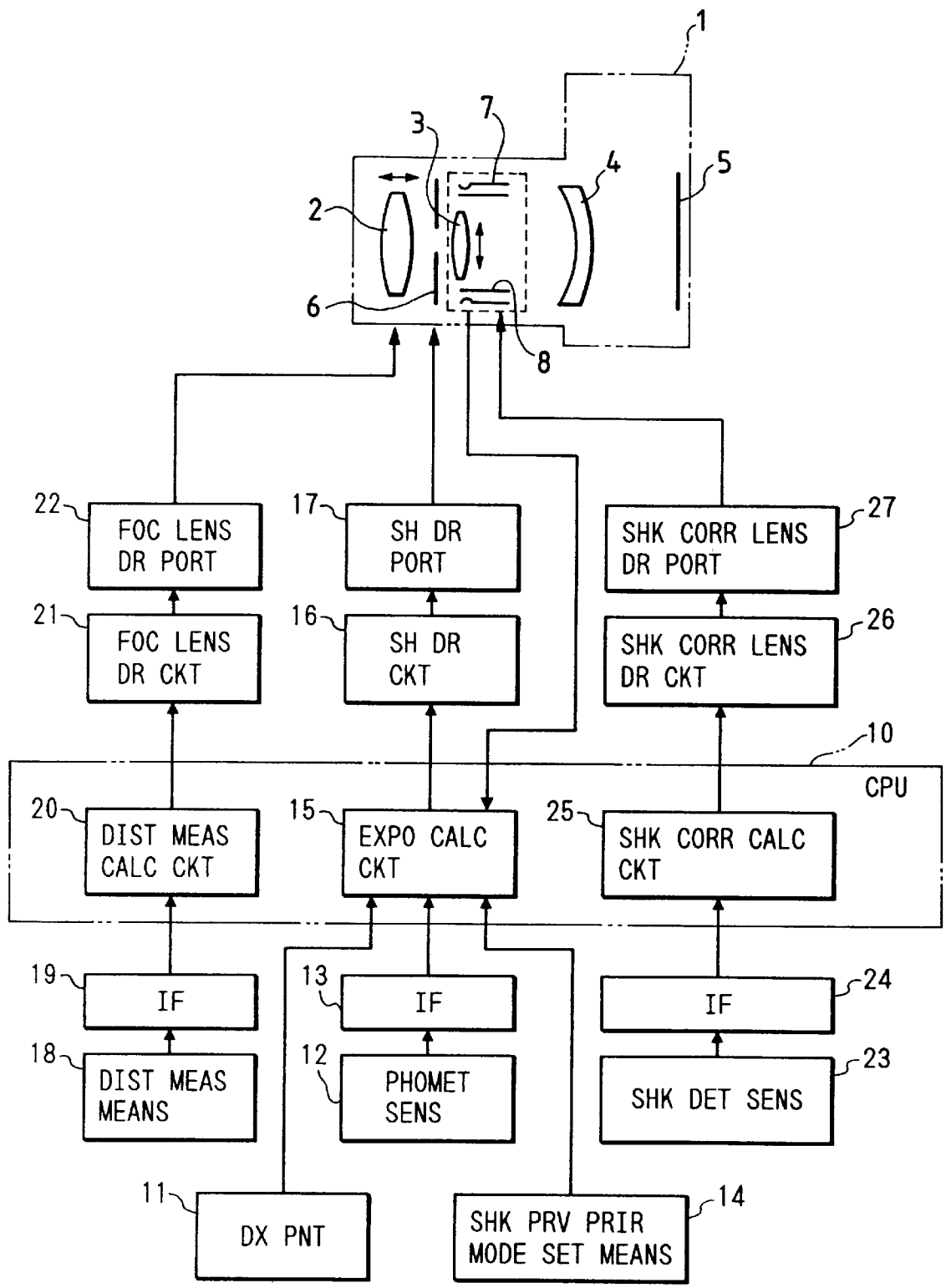
FIG. 1 is a block diagram to show an embodiment of a shake preventing apparatus according to the present invention.
Figure 2:
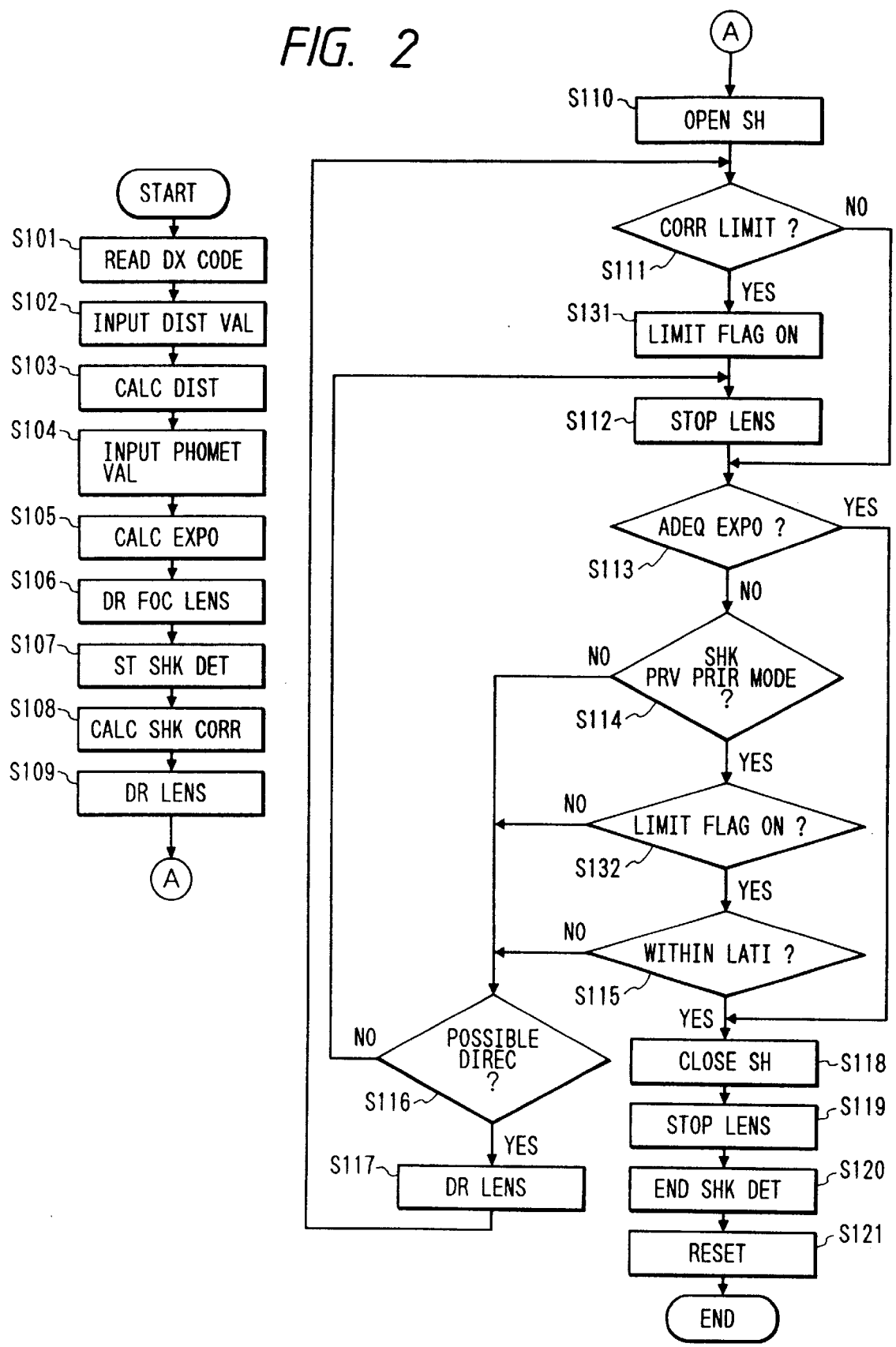
FIG. 2 is a flowchart to illustrate an operation of a control circuit in the apparatus of the embodiment.
Figure 3A:
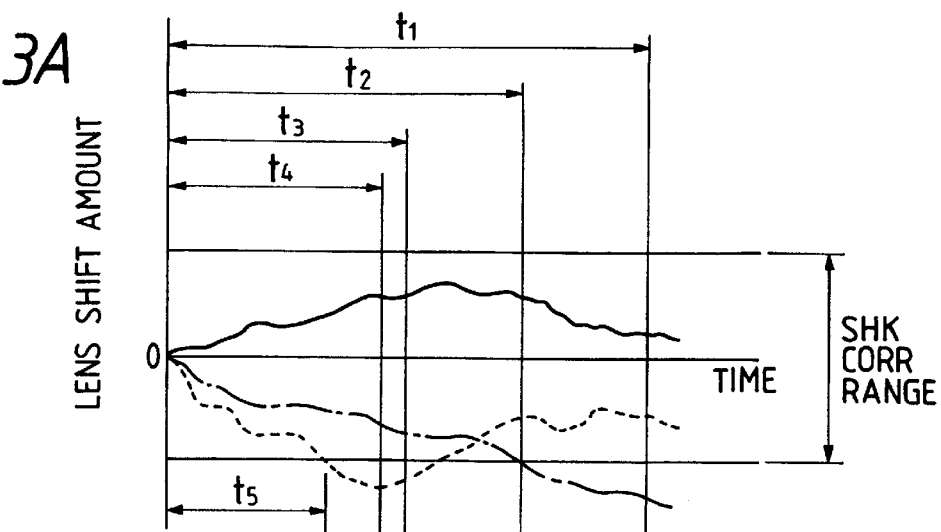
FIG. 3A to FIG. 3E are drawings to illustrate shake and a shutter control operation of the apparatus of the embodiment.
Figure 3B:
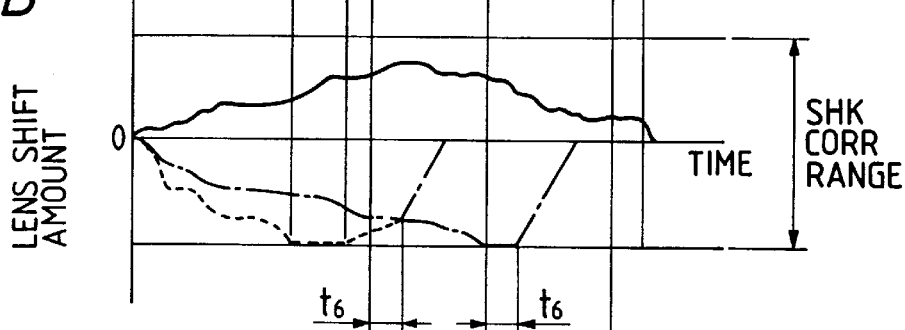
Figure 3C:
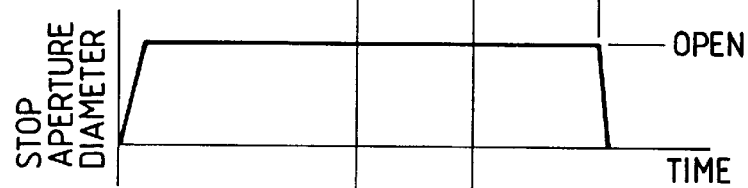
Figure 3D:
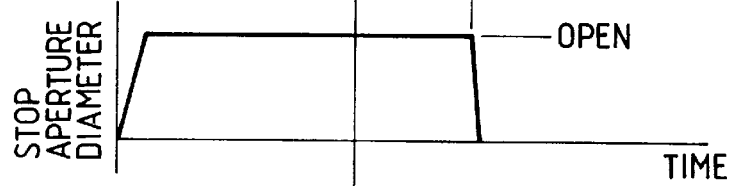
Figure 3E:
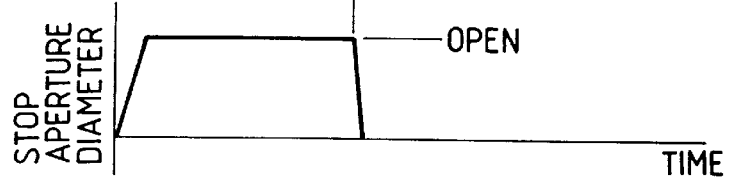

The present invention will be described in detail with embodiments with reference to the accompanying drawings. FIG. 1 is a block diagram to show an embodiment of a shake preventing apparatus according to the present invention, FIG. 2 a flowchart to illustrate an operation of a control circuit in the apparatus of the embodiment, and FIG. 3A to FIG. 3E drawings to illustrate shake and a shutter control operation of the apparatus of the embodiment, in which FIG. 3A shows a relation between a shake correction lens shift amount necessary for nullifying the shake and a time, FIG. 3B shows a relation between a shake correction lens shift amount with a shake correction limit being set and a time, and FIG. 3C to FIG. 3E are drawings to show relations between a stop aperture diameter and a time.

A camera 1 is provided with photo-taking lenses 2, 3, 4, and an image of a subject is focused on a film 5 mounted in the camera 1. The photo-taking lens 2 is a focusing lens to move in a direction of an optical axis thereof, and the photo-taking lens 3 is a shake correction lens to move in a direction normal to the optical axis to carry out a shake correction. Shutter blades 6 also serving as a stop are disposed between the photo-taking lenses 2 and 3.

Shake correction limit detecting switches 7, 8 (switches disposed in the direction perpendicular to the sheet plane of FIG. 1 are omitted) are switches to detect whether the shake amount reaches a shake correction limit preliminarily determined, which are structured to be turned on or off at respective stroke limit positions of the photo-taking lens 3. An output terminal of each shake correction limit detecting switch is connected to an exposure calculation circuit 15 in a CPU 10. A shift amount by which the shake correction limit detection switches 7, 8 are turned on is set to a maximum eccentricity tolerance of the lenses determined by lens properties thereof.

The CPU 10 comprises an exposure calculating circuit 15, a distance measurement calculating circuit 20, and a shake correction calculating circuit 25, which is a central processing unit to execute calculations thereof and a control of the entire camera.

A DX contact 11 is disposed in a film chamber of the camera 1, which is for reading a DX code such as coded ISO speed and exposure latitude provided on the film. An output terminal of the DX contact 11 is connected to the exposure calculating circuit 15. A photometry sensor 12 is a sensor to measure an amount of reflection light from a subject, and an output terminal of the photometry sensor 12 is connected through an interface 13 to the exposure calculating circuit 15.

A shake prevention priority mode setting means 14 is a manual operation switch for setting a mode as to whether a priority is to be given to the shake prevention operation, and an output terminal thereof is connected to the exposure calculating circuit 15.

The exposure calculating circuit 15 executes the following control concerning the shake prevention, in addition to a normal exposure calculation. In case that the shake prevention priority mode setting means 14 is set in the shake prevention priority mode and when the shake correction limit is detected (at time $t_2$ in FIG. 3B) during exposure by the shake correction limit detection switches 7, 8, the shutter blades 6 are immediately closed (at a time of $t_2$ in FIG. 3D) since exposure is done within the exposure latitude range (in which shutter time is greater than $t_3$ in FIG. 3F).

Unless the exposure is done within the exposure latitude range, the shutter blades 6 are closed at the time of $t_3$ in FIG. 3E.

If the shake correction limit is not detected during exposure by the shake correction limit detection switches 7, 8, the shutter blades 6 are closed at a timing to achieve a correct exposure amount (at a time of $t_1$ in FIG. 3C). In case that the shake prevention priority mode setting means 14 is not set in the shake prevention priority mode (in case of the exposure priority mode), the shutter blades 6 are closed at the timing to provide the correct exposure amount irrespective of presence or absence of detection of the shake correction limit by the shake correction limit detection switches 7, 8.

A distance measuring sensor 18 is a sensor for measuring a distance to a subject, and an output terminal thereof is connected via an interface 19 to the distance measurement calculating circuit 20. The distance measurement calculating circuit 20 produces a focusing drive signal based on a distance measurement value of the distance measuring sensor 18 to move the focusing lens 2 to an in-focus position through a focusing lens drive circuit 21 and a focusing lens drive portion 22.

A shake detecting sensor 23 is built in the camera 1 and is a sensor for detecting a small motion of the camera. The shake detecting sensor 23 may be one selected for example from an acceleration sensor to detect vibrations of the camera 1, an angular velocity sensor to detect rotational vibrations of the camera 1, and an optical sensor with a CCD on which an image of a subject is focused to detect movement of the image when the camera 1 is shaken. An output terminal of the shake detecting sensor 23 is connected through an interface 24 to the shake correction calculating circuit 25.

The shake correction calculating circuit 25 is a circuit to calculate a drive direction and a drive speed of the shake correction lens 3 for keeping an image of a subject on the film 5 unshaken based on the output of the shake detecting sensor 23, and an output terminal thereof is connected through a shake correction lens driving circuit 26 to a shake correction lens driving portion 27.

The shake correction lens driving portion 27 comprises a motor, which moves the photo-taking lens 3 in a direction of an arrow in FIG. 1 and in a direction perpendicular to the arrow and to the optical axis, based on the shift amount (FIG. 3A and FIG. 3B) of the shake correction lens 3 calculated by the shake correction calculating circuit 25.

An operation of the CPU 10 is next explained with reference to FIG. 2. The ISO speed and the exposure latitude are first read from the DX code on the film at S101. The distance measurement value from the distance measuring sensor 18 is then input at S102, and the distance measurement calculation is carried out by the distance measurement calculating circuit 20 at S103. Further, the photometry value from the photometry sensor 12 is input at S104, and the exposure calculation is conducted at S105. After that, the focusing drive signal is output to the focusing lens drive circuit 21 at S106 to drive the focusing lens 2 through the focusing lens driving portion 22.

Then the shake detection sensor 23 starts the shake detection at S107, the shake correction calculating circuit 25 calculates the shake correction amount at S108, and the shake correction lens drive signal is output to the shake correction lens driving circuit 26 to drive the shake correction lens 3 through the shake correction lens driving portion 27.

With a signal of full press of a release button not shown, a signal to open the shutter blades 6 is output at S110. Then it is judged with the output of the shake correction limit switches 7, 8 at S111 whether the shake correction limit is reached. If the shake correction limit is not reached, the flow proceeds to Step S113, while if the shake correction limit is reached, a limit flag signal is set on in a memory in the CPU 10 at S131 and the shake correction lens 3 is stopped at S112.

It is next judged at S113 whether the correct exposure is attained or not. With the correct exposure, the flow goes to Step S118 to immediately close the shutter blades 6. Without the correct exposure, it is judged at S114 whether the shake prevention priority mode setting means 14 is set in the shake prevention priority mode.

If in the shake prevention priority mode, it is judged at S132 whether the aforementioned limit flag signal is in an on state. It is then judged at S115 whether the exposure is done within the range of the exposure latitude. If done, the shutter blades 6 are closed at S118.

Unless the shake prevention priority mode setting means 14 is set in the shake prevention priority mode, unless the limit flag signal is in the on state, or, unless the exposure is within the exposure latitude, it is judged at S116 whether the shake is made in a shake correction possible direction. If the correction is impossible, the flow returns to Step S112. If the correction is possible, the shake correction lens 3 is driven at S117 then to return to Step S111.

The shutter blades 6 are closed at S118, the shake correction lens 3 is then stopped at S119, and the shake detection by the shake detecting sensor 23 is stopped at S120. After that, the focusing lens 2, the shake correction lens 3, the shutter blades 6, and others are reset at S121 to complete the control operation.

An operation of the shake preventing apparatus of this embodiment is next explained with specific examples with reference to FIG. 3A to FIG. 3E. FIG. 3A shows a shift amount of the shake correction lens necessary for nullifying the shake, and FIG. 3B shows a shift amount of the shake correction lens when the shake correction limit is set.

The shutter blades 6 always start opening from the reset position (where the eccentricity is zero). The time $t_1$ is a time between the shutter opening start and the shutter closing start in which the correct exposure is attained. The time $t_3$ is a time between the shutter opening start and the shutter closing start in which under exposure is resulted by the under side latitude (for example −1 EV) to the correct exposure. It is assumed that the shake prevention priority mode setting means 14 is set in the shake prevention priority mode (S114).

First explained is a case in which the shake appears within the shake correction limit.

The shake correction lens 3 is driven as shown by a solid line in either of FIG. 3A and FIG. 3B, while the shake correction limit switches 7, 8 are kept off (S111) and the limit flag signal is not in the on state. After the time $t_1$ to give the correct exposure has elapsed (S113), closing of the shutter blades 6 is started at a timing as shown in FIG. 3C (S118).

After a time $t_6$ enough to complete closing of the shutter blades 6 has elapsed, the shake correction lens 3 is stopped (S119), the shake detecting sensor 23 is stopped (S120), and the focusing lens 2, the shake correction lens 3, the shutter blades 6 and the like are reset (S121).

The drive of the shake correction lens 3 in the time $t_6$ is carried out according to the Steps S111 to S117, and details thereof are omitted to explain here.

Next explained is a case in which the shake exceeds the shake correction limit after the time $t_2$ has elapsed from the opening start of the shutter blades 6 ($t_3 < t_2$).

The shake correction lens 3 is driven as shown by an alternate long and short dash line in either of FIG. 3A and FIG. 3B, the shake correction limit switches 7, 8 are turned on at the time $t_2$ (S111), the limit flag signal is made on (S131), the shake correction lens 3 is stopped (S112), and it is judged whether the time for correct exposure has elapsed (S113).

Since $t_2 < t_1$, the flow proceeds from S113 through S114 and S132 to S115. Further, since $t_3 < t_2$ (S115), the shutter blades 6 are immediately closed (S118) as shown in FIG. 3D.

The process after Step S118 is the same as above.

Within the time $t_6$ after $t_2$, the shake still continues in the direction in which the shake correction lens 3 cannot be shifted, so that the lens 3 is kept at the limit shift position.

Next explained is a case in which the shake exceeds the shake correction limit after the time $t_5$ has elapsed from the opening start of the shutter blades 6 ($t_5 < t_3$).

The shake correction lens 3 is driven as shown by a broken line in either of FIG. 3A and FIG. 3B, the shake correction limit switches 7, 8 are turned on at the time $t_5$ (S111), the limit flag signal is made on (S131), the shake correction lens 3 is stopped (S112), and it is judged whether the time for correct exposure has elapsed (S113). Since $t_5 < t_3$ at this time, the exposure amount obtained is below the under side latitude of the correct exposure.

Thus the shutter blades 6 are not immediately closed, and the flow goes into a loop from S115 to S116. The shutter blades 6 are kept open before the time $t_3$ has elapsed (until the judgement at S115 is affirmed. Once the limit flag signal is made on at S131, the judgement at S132 is always affirmed thereafter.) After the time $t_3$ has elapsed, the shutter blades 6 are closed in a timing as shown in FIG. 3E (S118).

The process after S118 is the same as above.

Since the shake continues in the direction in which the shake correction lens 3 cannot be shifted at a time between the time $t_5$ and the time $t_4$ as shown in FIG. 3A (S116), the shake correction lens 3 is kept at the limit shift position as shown in FIG. 3B.

In this occasion, the shake correction lens driving portion 27 is stopped by the signal of the shake correction limit switches 7, 8 (S112). The shake is turned in the direction in which the shake correction can be effected, at a time after the time $t_4$ up to the time $t_3$ (S116), so that the shake correction lens 3 is again driven for shake correction as shown in FIG. 3B (S117).

In either case of the above examples, the shake correction lens 3 is driven to be reset at the zero position of eccentricity (S121) after a constant time ($t_6$) has elapsed from the closing start of the shutter blades 6, as shown in FIG. 3B, in order to stop a waste shake correction drive after the completion of exposure and to prepare as soon as possible for the next photography.

As detailed above, according to the present invention, the shake correction is carried out when the shake is detected during exposure, and the shutter time is shifted only if the shake correction is not sufficiently effected, whereby the shake prevention effect is made very great and the frequency of shift of the shutter time is made very low.

Also, the camera with the shake preventing apparatus according to the present invention can provide a photograph pursuant to a photographic purpose, can broaden a range of hand carrying photography without shake (for example the focal length and the shutter time), and is superior in operability.

Figure 7:
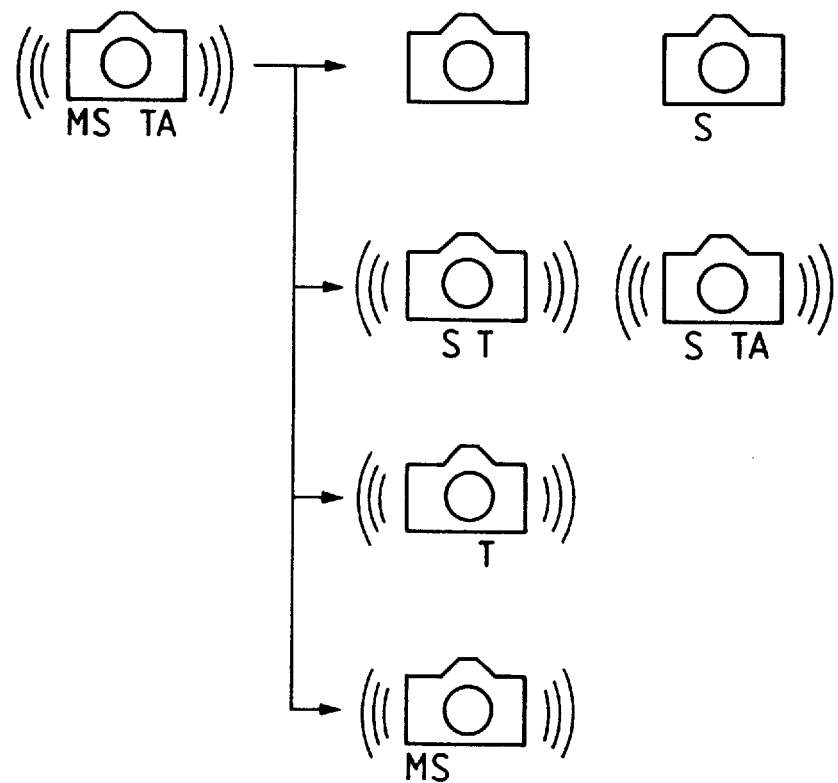
FIG. 7 is a schematic explanatory drawing to illustrate displays for normal photography, for electronic flash photography, for shutter time change photography, and for multiple electronic flash photography.
Figure 8:
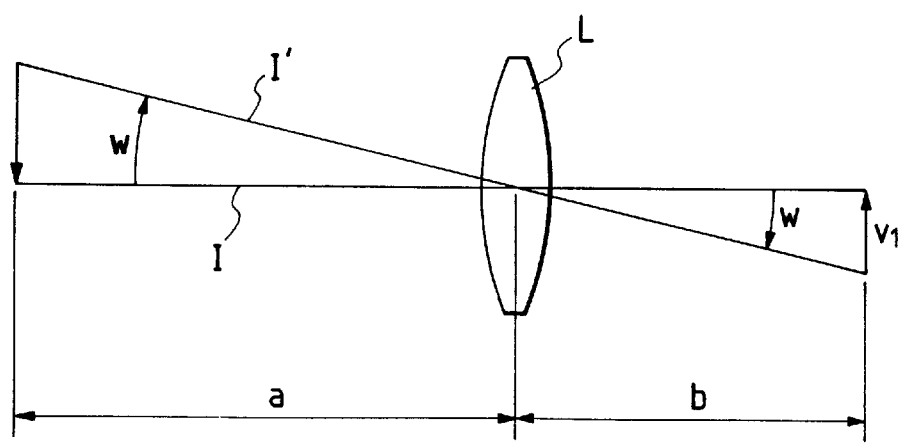
FIG. 8 is a schematic explanatory drawing to illustrate a relation between an angular velocity upon inclination of camera, and shake.
Figure 9:
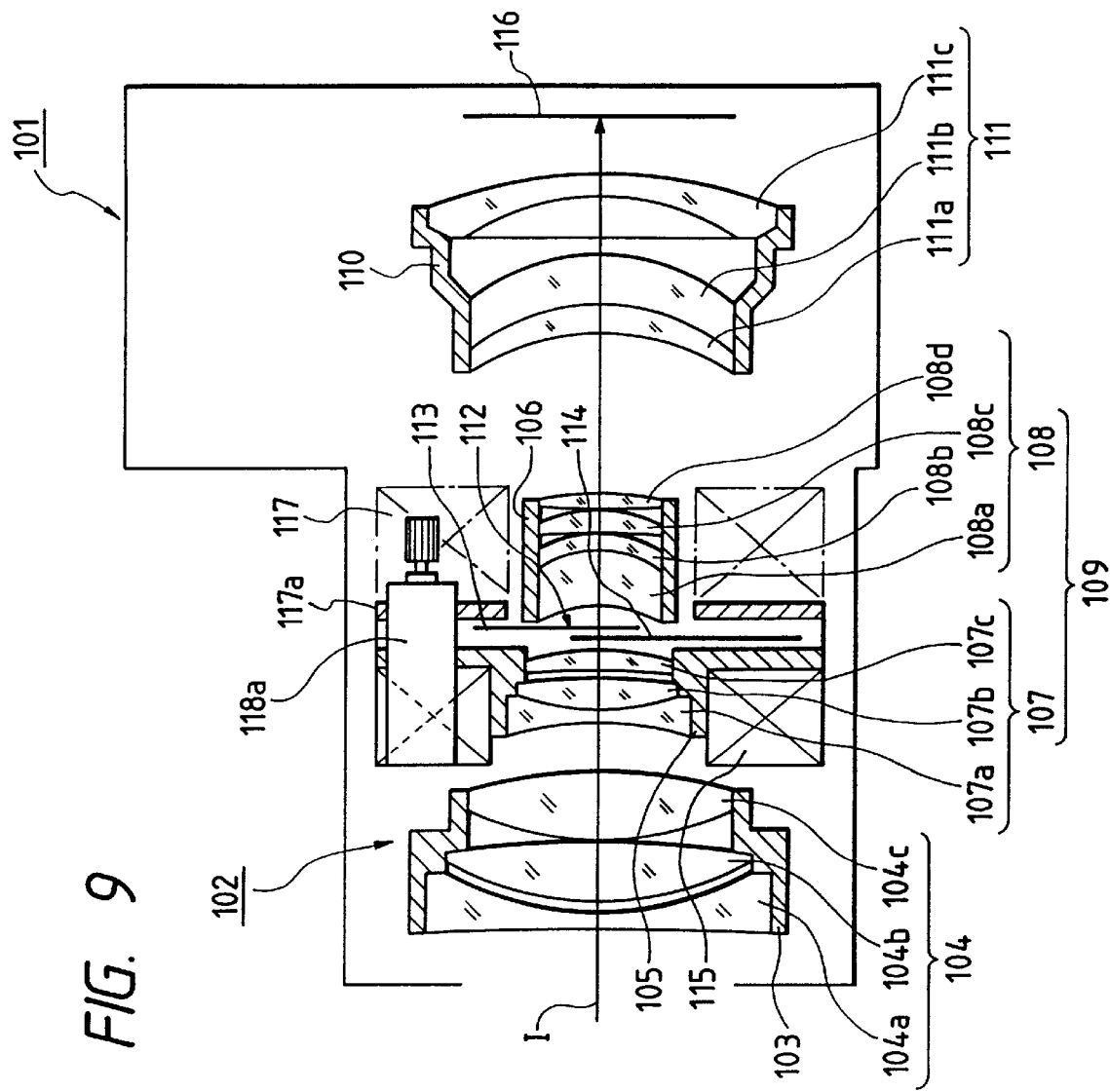
FIG. 9 is a schematic constitutional drawing to illustrate a schematic construction of a camera to which the shake preventing apparatus for camera according to the present invention is suitably applied.

FIG. 4 to FIG. 9 show another embodiment of the shake preventing apparatus according to the present invention. First explained with FIG. 9 is a schematic structure of a camera having a photo-taking lens system with a lens shutter suitable for application of the present invention.

A camera as designated by a reference numeral 101 has a photo-taking lens system 102 comprising a first lens group 104 in which three lenses 104a, 104b, 104c are held in a lens frame 103; a second lens group 109 comprised of seven lenses of front and rear lens groups 107, 108 in which the front lens group 107 of three lenses 107a, 107b, 107c and the rear lens group 108 of four lenses 108a, 108b, 108c, 108d are held in respective lens frames 105, 106; and a third lens group 113 in which three lenses 111a, 111b, 111c are held in a lens frame 110.

Numeral 112 denotes a lens shutter which is interposed between the front and rear lens groups 107 and 108 of the second lens group 109 as described above and which comprises shutter curtains 113, 114 and a drive portion 115 for driving them. The lens shutter 112 may be replaced by a lens shutter also serving as a stop. The drive portion 115 is disposed on an outer periphery of the lens frame 105 of the front lens group 107 in the second lens group 109, and further the shutter curtains 113, 114 are located right before the rear lens group 108 serving as an image shake prevention lens as described below.

Further, reference numeral 116 designates an image surface on a film on which an image of a subject is focused by the first, the second, and the third lens groups 104, 109, 111 constituting the above-described photo-taking lens system 2. Also, I in the drawing represents an optical axis of the photo-taking lens system 102.

In the photo-taking lens system 102 as so arranged having the three lens groups 104, 109, 111, the rear lens group 108 in the second lens group 109 is arranged for example as an image shake prevention lens which is properly shifted in a direction perpendicular to the optical axis I by an image shake prevention mechanism 117 (a specific structure of which is omitted from explanation) whereby to prevent the image shake.

In detail, the image shake prevention mechanism 117 is structured to move the rear lens group 108 (as will be hereinafter referred to as a shake prevention lens 108) by a predetermined amount in a certain composite direction by properly moving two motors 118a, 118b (only one of which is shown in FIG. 9; see FIG. 4) for example in the x- and the y-directions, whereby an image formed on the image surface 116 is moved in accordance with a state of image shake to effect relative prevention of the image shake.

Numeral 117a in FIG. 9 denotes a base substrate of the mechanism 117, to which a member constituting the mechanism 117 is mounted in an annular space formed around the lens frame 106 of the shake prevention lens 108.

Figure 4:
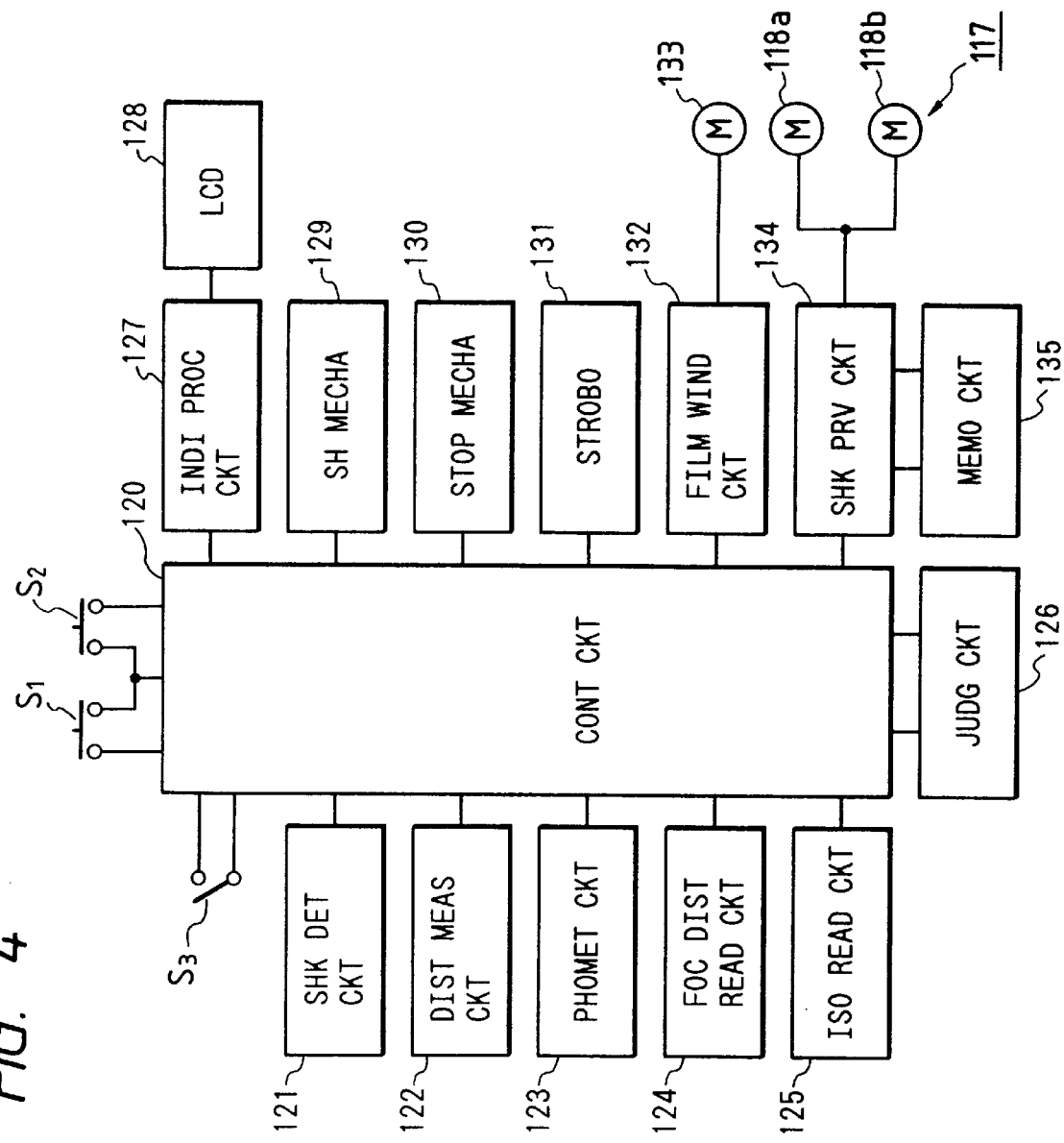
FIG. 4 is a block diagram of circuit constitution to show another embodiment of the shake preventing apparatus in a camera according to the present invention.
Figure 5:
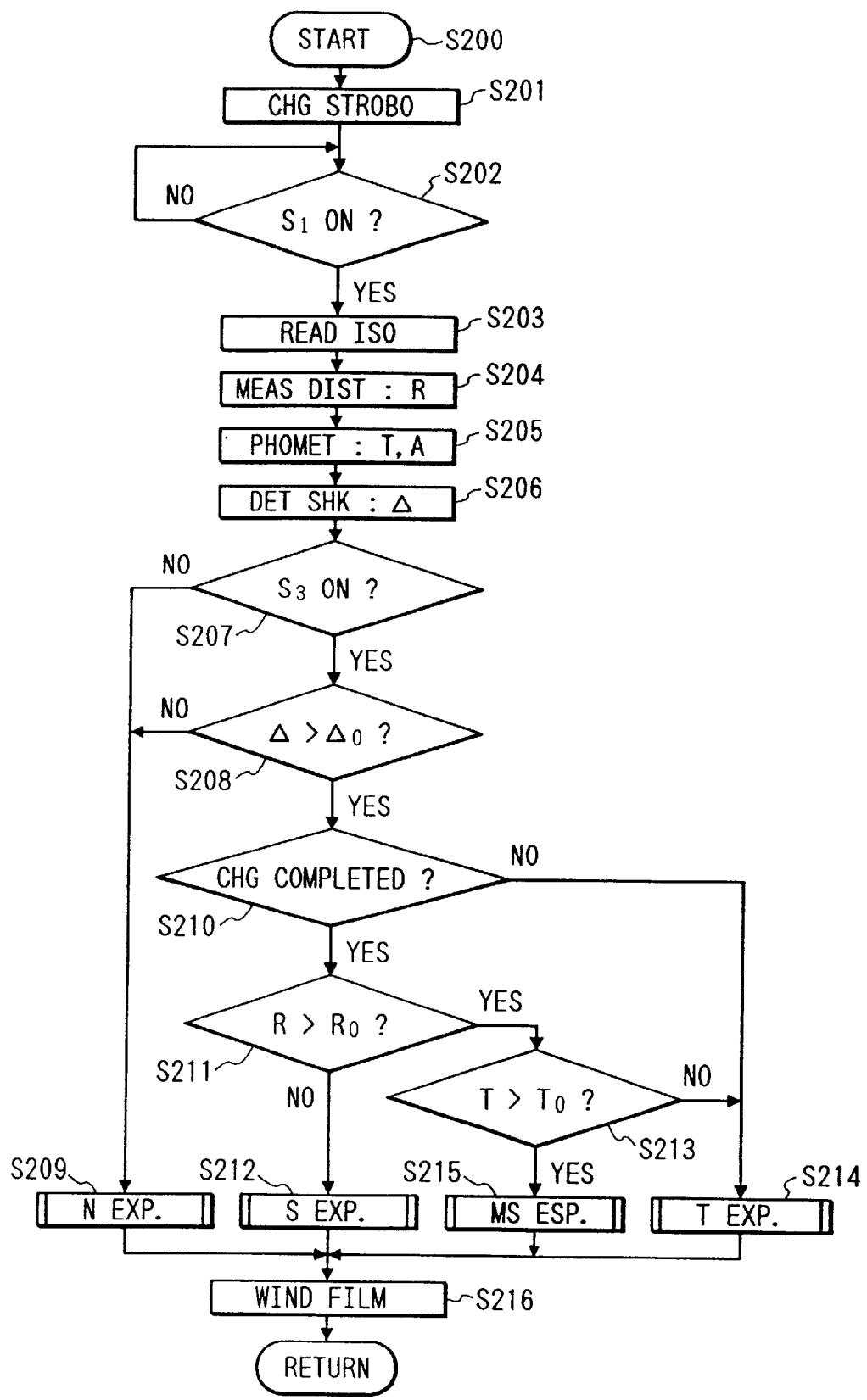
FIG. 5 is a flowchart to illustrate a function of the circuit constitution as shown in FIG. 4.

According to the present invention, the camera 101, which is provided with the image shake prevention mechanism 117 for driving the shake prevention lens 108 as described and which can serve in electronic flash photography, is characterized in that a control circuit 120 for executing various controls of the camera is arranged as shown in FIG. 4 and that the control circuit 120 is operated as shown in FIG. 5, whereby effective image shake prevention can be achieved.

The control circuit 120 to carry out various controls of the camera is first briefly explained with respect to FIG. 4.

The control circuit 120 is provided with a switch S1 which is turned on by a half press operation on a release button not shown, with a switch S2 which is turned on by a full press operation thereof, and with a mode change switch S3.

Numeral 121 designates a shake detecting circuit made with a known angular velocity sensor as shake detecting means for detecting shake by detecting a motion of the camera, numeral 122 a distance measuring circuit (distance measuring means) for measuring a distance to a subject, numeral 123 a photometry circuit (photometry means) for conducting photometry of brightness of the subject, numeral 124 a focal length reading circuit for reading a focal length of the photo-taking lens system 102, numeral 125 an ISO reading circuit for reading film information, and numeral 126 a judging circuit for judging information of the mode change switch S3. These circuits are connected to the control circuit 120 to carry out various controls in accordance with respective signals.

The control circuit 120 controls a display processing circuit 127 to execute a display control of an LCD 128 as display means, the shutter mechanism 129 (corresponding to the lens shutter mechanism 112 in FIG. 9), a stop mechanism 130, an electronic flash unit 131 to carry out an electronic flash photography, a film winding circuit 132 to control a film winding motor 133, and a shake preventing circuit 134 to drive-control motors 118a, 118b in the aforementioned image shake prevention mechanism 117.

The shake preventing circuit 134 is a circuit that drives the above-described motors 118a, 118b to motion-control the shake prevention lens 108 (see FIG. 7) in a desired state, to which a memory circuit 135 is connected for storing a position of the shake preventing lens 108.

A function of the control circuit 120 as so arranged is next explained with reference to the flow chart as shown in FIG. 5.

The control circuit 120 is first started by turning on a main switch (not shown) of the camera 101 at Step S200, and an electronic flash unit 131 is charged as shown at Step S201.

It is judged at Step S202 whether the switch S1, which is arranged to be turned on by the half press operation on the release button, is turned on or not. When the switch S1 is turned on, the ISO is read at Step S203, a distance R is measured to a subject by the distance measuring circuit 22 at Step S204, a shutter time T and a stop value A are set by photometry of brightness of the subject by means of the photometry circuit 123 at Step S205, and detection of shake $\Delta$ is further started by the shake detecting circuit 121 at Step S206.

Then, the judging circuit 126 judges whether the mode change switch S3 is off at Step S207. If the mode change switch S3 is on and if the shake $\Delta$ is smaller than a predetermined value $\Delta 0$ at Step S208, a normal photography "N EXP." is carried out at Step S209. When the above-described mode change switch S3 is off, the normal photography "N EXP." is also carried out at Step S209 as described.

The predetermined value $\Delta 0$ of shake is the maximum shake with which the aforementioned mechanical image shake prevention mechanism 117 can prevent the image shake. If the camera does not include the image shake prevention mechanism 117, the predetermined value $\Delta 0$ is defined as a diameter of permissible circle of confusion. The diameter of permissible circle of confusion 6 is obtained by the following equation with a width d across corners of a screen.

$$\delta = \{(d/2) + 10\}/1000 \tag{1}$$

If the judging circuit 126 judges at Steps S207 and S208 that the mode change switch S3 is on and that the shake $\Delta$ is greater than the predetermined value $\Delta 0$, the following steps are carried out. If the judging circuit 126 judges at Steps S210 and S211 that the charge of the electronic flash unit 131 is completed and that the measured distance R shows a nearer distance than a predetermined value R0, the electronic flash photography "S EXP." is conducted at Step S212.

The predetermined value R0 of distance is obtained by the following equation with a guide number GN of the electronic flash unit 131 and with FNo which is the stop value A set at the above Step S205.

$$R0 = 2GN \times FNo \tag{2}$$

Either if the judging circuit 126 judges at Step S210 that the charge of the electronic flash unit 131 is not completed or if the distance R shows a farther distance than the predetermined value R0 at Step S211 and further the shutter time T is shorter than a predetermined value T0 at Step S213, a shutter time change photography "T EXP." is performed at Step S214. The predetermined value T0 of shutter time is set longer than a recycle time of the electronic flash unit 131.

If the judging circuit 126 judges that the charge of the electronic flash unit 131 is completed at Step S210, that the distance R shows the farther distance than the predetermined value R0 at Step S211 and further that the shutter time T shows a longer time than the predetermined value T0 at Step S213, a multiple electronic flash photography "MS EXP." is performed in which the electronic flash unit 131 supplies a plurality of light emissions during single exposure at Step S215.

After either of the above four photographies is ended, the film winding is carried out at Step S216, and the flow returns to the start.

Before description of the above four photography types, a relation between an angular velocity at which the camera 101 is inclining and the shake is briefly explained in the following with FIG. 8.

There is a relation represented by the following equation among a distance a from the lens L to a subject, a distance b from the lens to the image surface, and a focal length f of the lens L.

$$1/a + 1/b = 1/f \qquad (3)$$

Using the above relation, when the optical axis I is inclining at an angular velocity $\omega$ to I', a velocity $v_1$ at which an image is moving on the image surface may be represented by the following equation if the direction of an arrow in FIG. 8 is defined as positive.

$$v_1 = \{af/(a-f)\}\omega \qquad (4)$$

If the shutter time is t, the shake amount $\Delta$ is obtained by the following equation.

$$\Delta = v_1 t \qquad (5)$$

Suppose the aforementioned shake prevention mechanism 117 can move the image at a velocity $v_2$ on the image surface 116. Then the image shake can be prevented up to the shake amount $\Delta 0$ represented by the following equation.

$$\Delta 0 = v_2 t \qquad (6)$$

The aforementioned four photography types are now detailed in the following.

(1) Normal photography "N EXP."

Figure 6:
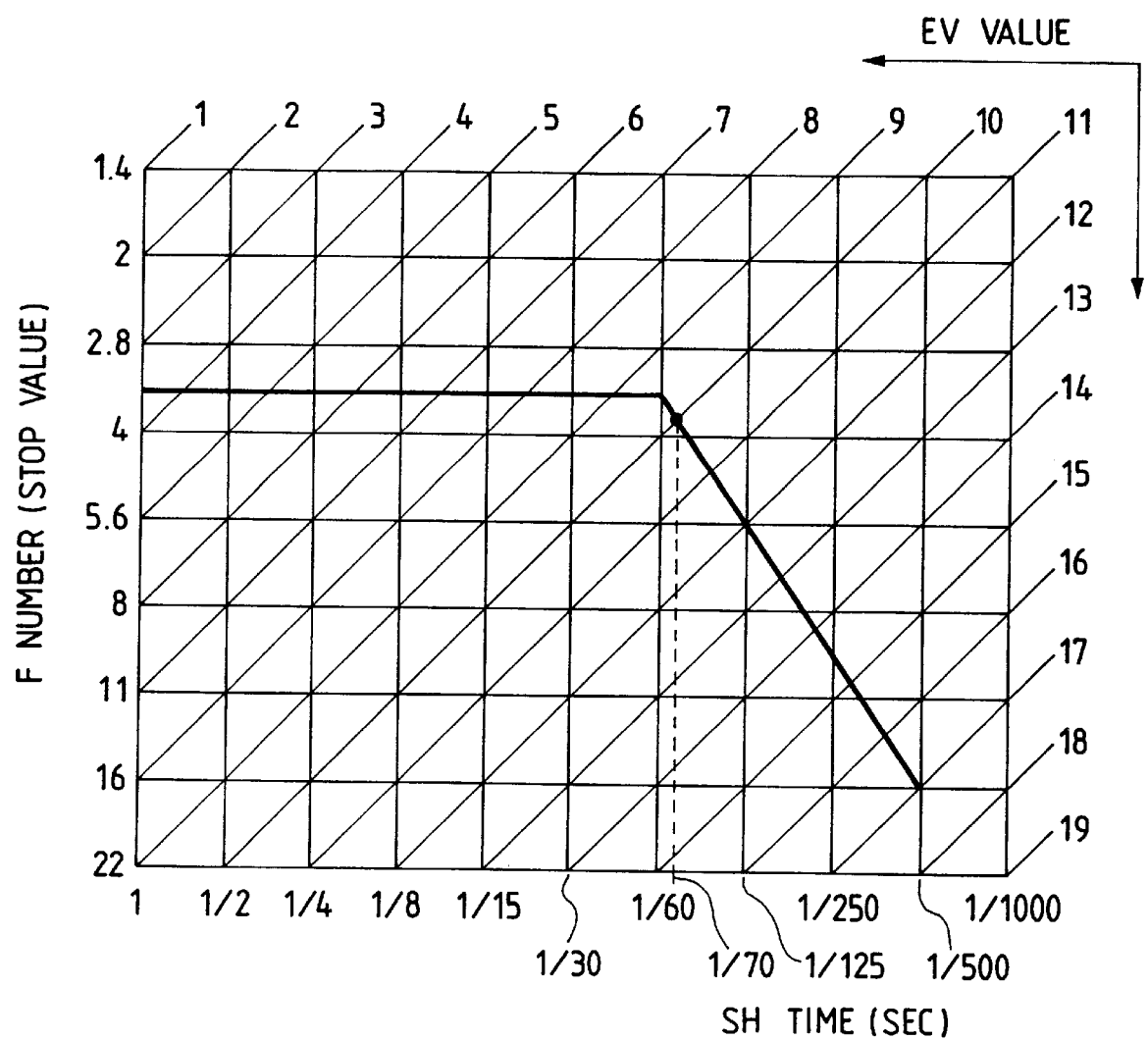
FIG. 6 is a program chart to show a combination of a shutter time with an f-number preliminarily set against each of EV values.

If the shutter time T is shorter than (1/f mm) sec. from the brightness of the subject and the focal length f of the photo-taking lens in the program automatic exposure as shown in FIG. 6, a photography is carried out following the program chart without using the electronic flash unit 131. If longer, a photography is carried out with light emission of the electronic flash unit 131 with the shutter time T being set at (1/f mm) sec. The shake prevention mechanism 117 is not operated at this time.

If the camera is arranged such that the electronic flash unit 131 can be inhibited from emitting light and if the inhibition of light emission of the electronic flash unit 131 is selected, the same photography as above is carried out when the shutter time is shorter than (1/f mm) sec. If longer, the light emission of the electronic flash unit 131 is not performed and the photography is carried out at the shutter time of program chart in FIG. 6 while operating the shake prevention mechanism 117.

In case that the shake prevention mechanism 117 is not provided, the shutter time to actuate the light emission of the electronic flash unit 131 may be changed by the shake $\Delta$.

Supposing the focal length of the photo-taking lens system 102 is for example 70 mm, (1/f mm) sec-(1/70) sec. In a focal plane shutter camera, a time below the X contact is employed in place of (1/f mm) sec.

(2) Electronic flash photography "S EXP."

There is a chance for the shake prevention mechanism 117 to fail to prevent the shake with a large shake $\Delta$. Then, if the shutter time T is shorter than the shutter time in which the shake prevention mechanism 117 can prevent the shake (that is, in case of such a shutter time that $\Delta > \Delta 0$), from the brightness of the subject and the focal length f mm of the photo-taking lens in the program automatic exposure as shown in FIG. 6, the shake prevention mechanism 117 is operated and the photography is carried out following the program chart without using the electronic flash unit 131. If the shutter time T is longer than that, the photography is started using the electronic flash unit 131 and the shutter is immediately closed after light emission of the electronic flash unit 131. In this occasion, the shake prevention mechanism 117 may be kept non-operating.

According to such an electronic flash photography, the shake of a main subject may be prevented using the electronic flash unit 131 and the shake of background beyond reach of electronic flash light may also be prevented.

In case that the camera does not include the shake prevention mechanism 117, the electronic flash unit 131 may be arranged to emit light in a time not more than the shutter time in which the shake $\Delta$ becomes greater than the diameter of permissible circle of confusion 6 in relation with the shutter time T.

Another embodiment of the electronic flash photography "S EXP." is as follows. If the shutter time T is longer than the shutter time in which the shake prevention mechanism 117 can prevent the shake, the photography is started using the electronic flash unit 131 and the stop mechanism 130 is immediately opened after light emission of the electronic flash unit 131 to shorten the shutter time thereby. In this 15 case, the shake prevention mechanism 117 may be operated or may not be operated.

The shake of the main subject may be effectively prevented using the electronic flash unit 131 while the shake of the background beyond reach of electronic flash light may also be prevented, obtaining the correct exposure.

In this example, the use of the electronic flash unit 131 is determined by the shutter time in which the shake prevention mechanism 117 can prevent the shake. It can be determined, however, by using (1/f mm) sec in the same manner as in the normal photography "N EXP.".

(3) Shutter time change photography "T EXP."

The shake cannot be prevented using the electronic flash unit 131 in case that the charge of the electronic flash unit 131 is not completed or that with completion of the charge of the electronic flash unit 131 the main subject is beyond reach of electronic flash light. Also, if the shutter time T is shorter than the predetermined value T0 even with completion of charge, the multiple electronic flash photography "MS EXP." as described below cannot be performed. Then this mode is used in such cases.

The shutter time is shortened to the shutter time T determined by photometry, and the photography is carried out while operating the shake prevention mechanism 117.

Since the shutter time change photography shortens the shutter time, it can prevent the shake which cannot be prevented by the shake prevention mechanism 117.

(4) Multiple electronic flash photography "MS EXP."

This mode is used in case that the main subject is beyond reach of electronic flash light to cause exposure shortage.

Then, if the shutter time T is longer for example than the recycle time T0 of the electronic flash unit 131, the shake prevention mechanism 117 is operated, the exposure is started, the electronic flash unit 131 emits light, and the memory circuit 135 stores a position of the shake prevention lens 108 at this time.

A position detection of the shake prevention lens 108 may be carried out for example by encoders provided on respective output shafts of the motors 118a, 118b to detect rotations of the output shafts.

When the shake prevention lens 108 returns during exposure to the position where the electronic flash unit 131 has emitted light, the electronic flash unit 131 again emits another light. This is repeated within the shutter time T, or before the correct exposure is achieved.

If the shutter time T is shorter than the recycle time T0 of the electronic flash unit 131, the above-described shutter time change photography "T EXP." is carried out. Thus, the correct exposure may be obtained even at a distance beyond reach of electronic flash light.

Each of the above-described photographies is started with the full press operation on the release button to turn on the switch S2.

It is convenient in shake prevention with the above-described electronic flash photographies that the situation display for example as shown in FIG. 7 be given for the above four photography types.

This display is given by the LCD 28 as shown in FIG. 4. The left upper portion in FIG. 7 shows all segments of the display portion displayed, and the right portion shows examples of the display.

The uppermost row in FIG. 7 represents the normal photography "N EXP.", in which the left display is for photography without the electronic flash unit 131, and in which the right display is for photography with the electronic flash unit 131. Character "S" means that the electronic flash unit 131 is in use.

The second row in FIG. 7 shows the electronic flash photography "S EXP.", in which the left display is for photography with the shutter time changed, and in which the right display is for photography with the shutter time and the stop changed. "T" means that the shutter time is changed, and "A" means that the stop is changed.

Further, the third row in FIG. 7 shows the case of the shutter time change photography "IT EXP.".

Also, the fourth row in FIG. 7 shows the case of the multiple electronic flash photography "MS EXP.".

These displays may be actuated by an on operation of the switch S1 conducted by the half press operation on the release button, and may be given within a finder or on the outside of the camera.

The shake preventing apparatus as so arranged according to the present invention may efficiently prevent the shake as follows even in a case of large shake, with combined use of the electronic flash unit 131.

In detail, in case that a shake amount detected by the shake detecting means 121 is large and that the electronic flash photography is carried out, the shutter is controlled to close immediately after the electronic flash light emission, whereby the problem of the background shake may be solved upon execution of the electronic flash photography "S EXP.".

Also, in case that the shake amount is large, that the electronic flash photography is carried out, and that the set shutter time is long, the stop is opened after the electronic flash light emission, and thus the shutter time can be shortened thereby, whereby the problem of the background shake may be solved upon execution of the electronic flash photography "S EXP." similarly as in the above example.

Further, in case that the shake amount is large, and either that the electronic flash unit 131 is uncharged or that a subject is too far, only the shutter time can be controlled to shorten without emission of the electronic flash unit. Thus carrying out the shutter time change photography "T EXP.", the shake may be prevented even if the electronic flash unit 131 is uncharged. Also, upon execution of the multiple electronic flash photography "MS EXP.", the correct exposure may be achieved at a far distance beyond reach of electronic flash light.

It is needless to mention that the present invention is not limited to the above-described arrangements in the embodiments, and that the shapes and structures of the respective portions including the image shake prevention mechanism 117 constituting the shake preventing apparatus of the camera may be suitably modified or changed.

Although the present invention is applied to the camera 101 having the lens shutter 112 in the above embodiments, the application is not limited to such a camera, but the same effect may be enjoyed in image shake prevention caused by the camera shake in conventionally known cameras.

The shake preventing apparatus as described according to the present invention has the shake detecting means, the distance measuring means, and photometry means in a camera which can select the electronic flash photography in case that the shake amount detected by the shake detecting means is greater than the predetermined value. If the electronic flash photography is selected in the camera, the shutter time set according to the photometry result of the photometry means is arranged to be changeable. Then, in case that the shake amount detected by the shake detecting means is large and that the electronic flash photography is carried out, the shutter may be controlled to close immediately after the electronic flash light emission.

In the shake preventing apparatus in the camera according to the present invention, in case that the electronic flash photography is selected and that the shutter time set according to the photometry result of the photometry means is longer than a predetermined value, the shutter time and the stop value set according to the photometry result of the photometry means are arranged to be changeable, respectively. Then, if the shake amount is large and if the set shutter time is long upon the electronic flash photography, the stop is opened after electronic flash light emission and the shutter time may be shortened thereby.

Further, in the shake preventing apparatus in the camera according to the present invention, in case that the shake amount detected by the shake detecting means is greater than a predetermined value, and either that the electronic flash unit is uncharged or that the photometry result of the photometry means shows a farther distance than a predetermined value, the electronic flash photography is not selected and only the shutter time set according to the photometry result of the photometry means is arranged to be changeable. Thus, if the shake amount is large and either if the electronic flash unit is uncharged or if the subject is too far, only the shutter time may be controlled to shorten without electronic flash light emission.

According to the present invention as described, the shake may be efficiently prevented as follows with the combined use of the electronic flash unit even in case of large shake.

Various advantages are attained in the present invention for example: the problem of the background shake is solved in the electronic flash photography "S EXP."; the shake may be effectively prevented with the electronic flash unit uncharged upon execution of the shutter time change photography "T EXP."; and the correct exposure may be achieved at a far distance beyond reach of electronic flash light upon execution of the multiple electronic flash photography "MS EXP.".

What is claimed is:

1. A camera for preventing a camera shake comprising:
a selector capable of setting a shake prevention preference mode and an image quality preference mode;
and a terminator capable of terminating an exposure operation, in response to an event where the selector selects the shake prevention preference mode.

2. A camera for preventing a camera shake comprising:

a photometric portion for photometering brightness of an object;

a first determining portion for determining a first exposure time based upon a photometering result from said photometric portion;

a second determining portion for determining a second exposure time shorter than the first exposure time;

a selector capable of setting a shake prevention preference mode and an image quality preference mode; and an exposing portion for performing an exposure operation within a range between the second exposure time and the first exposure time when the shake prevention preference mode is set, and at the first exposure time when the image quality preference mode is set.

* * * * *